Sept. 27, 1949.  R. B. SHORE  2,482,944
PIPE JOINT
Filed March 10, 1944

*INVENTOR.*
RICHARD B. SHORE
BY
ATTORNEYS

Patented Sept. 27, 1949

2,482,944

UNITED STATES PATENT OFFICE 2,482,944

PIPE JOINT

Richard B. Shore, Waterloo, Iowa, assignor to Deere Manufacturing Co., a corporation of Iowa Application March 10, 1944, Serial No. 525,836

12 Claims. (Cl. 285—49)

1

The present invention relates generally to sheet metal construction and more particularly to means for and the method of connecting a fitting to a wall of sheet metal or the like, and is well adapted but not limited to inlet and outlet fixtures for sheet metal tanks, such as vehicle fuel tanks and the like. Heretofore, conventional outlet fittings for fuel tanks and the like have usually taken the form of flanged bushings inserted through openings in the sheet metal, the bushing flanges being adapted to lie against the surface of the tank and being fixed thereto by soldering, riveting, welding, or the like. The outlet duct or tube is then connected to the bushing by a suitable fitting which is screwed into the bushing. When it is desired to detach the outlet duct after an extended period of service, it is frequently found that considerable force is required to unscrew the fitting from the bushing, because of rust or corrosion between the threads. In some cases, the force necessary to unscrew the fitting has resulted in tearing or loosening the bushing flange from the sheet metal tank wall, starting leaks around the bushing and sometimes rendering the tank unfit for further use.

The principal object of the present invention relates to the provision of novel and improved means for making a connection with a sheet metal tank wall or the like which can withstand considerably greater forces tending to rotate the bushing relative to the wall without loosening the connection between the bushing and the wall, thereby preventing the occurrence of leaks around the bushing.

A more specific object of my invention relates to the provision of a connection in which the sheet metal of the wall is formed into an interlocking relation with the fitting. In the accomplishment of this object, the sheet metal is pressed or drawn to provide a socket or recess in which the fitting is adapted to seat, and then is further secured by swaging the sheet metal around the fitting to prevent separation of the fitting from the wall without an actual distortion or failure of the sheet metal around the fitting. A further object has to do with filling the recess about the fitting with solder or other sealing material. This provides a gas- or liquid-tight connection which does not depend entirely upon the bond or adhesive strength of the filling or sealing material, as is the case in conventional fitting mountings, for the seating and interlocking arrangement between the fitting and the recess requires that the sheet metal forming the

2 sheet for the fitting be actually distorted or broken before the solder or other sealing material is torn loose.

These and other objects and advantages of my invention will be apparent to those skilled in the art after a consideration of the following description and drawings appended hereto, in which Figure 1 is a plan view of a portion of a wall having an opening therein prepared according to the principles of my invention.

Figure 1:
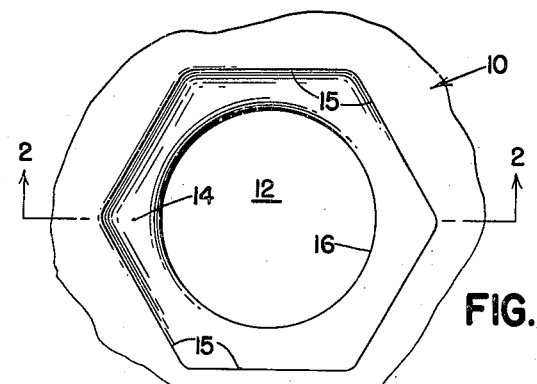
Figure 2:
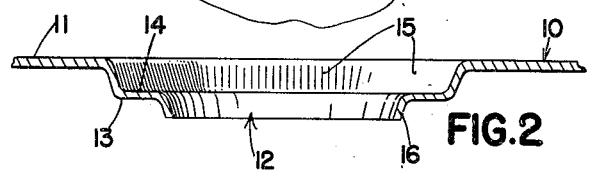
Figure 2 is a sectional view taken along the line 2—2 in Figure 1.
Figure 3:
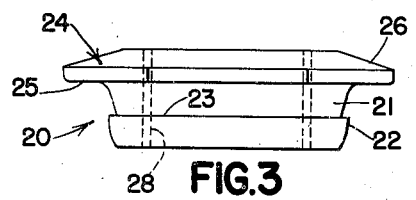
Figure 3 is a side elevational view of a bushing adapted to be installed within the opening shown in Figures 1 and 2.
Figure 4:
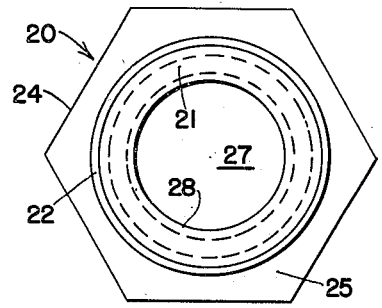
Figure 4 is a plan view of one end of the bushing shown in Figure 3.
Figure 5:
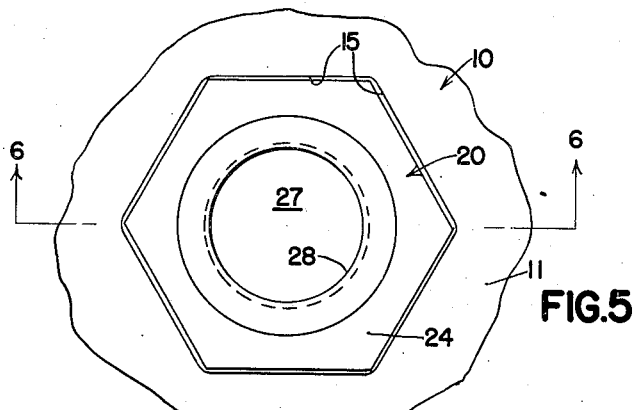
Figure 5 is a plan view showing the bushing installed within the opening in the wall, before soldering.

Referring now to the drawings, reference numeral 10 indicates the main wall of a first member such as a tank made up of thin sheet material, sheet metal according to the present embodiment, to which it is desired to make the connection. The inside surface of the tank is indicated by reference numeral 11, and the opening in the tank is indicated generally by reference numeral 12. According to the present invention, the sheet metal is drawn to provide angularly related wall sections forming an offset portion 13 providing an indentation or recess 14 generally in the shape of a cup below the inner surface 11 of the wall 10 and around the opening 12. The recess or cup 14 is polygonal in shape, there being six sides 15 shown in the present embodiment. An annular flange 16 extends downwardly from the bottom of the cup formed by the offset portion 13 and surrounds the opening 12, extending axially away from the surface 11 of the wall 10.

Preferably, the opening 12 and the offset portion around the opening is made in a single operation by means of a compound die, which is applied under pressure upon the sheet metal wall, simultaneously punching the hole and pressing the recess, according to principles well-known to those skilled in the art.

A second member or bushing 20 comprises an annular body 21 which is generally circular in cross section and has on one end thereof an annular groove that provides a bead 22 extending peripherally around the end of the body 21 and of slightly larger diameter, the inner side 23 of the bead being disposed in a substantially radial plane to form an annular shoulder. The other end of bushing 20 is provided with a head 24, the inner face 25 of which is disposed in a generally radial plane, and the outer side portion 26 of the head is reduced or beveled to a conical surface having an apex above the body of the bushing. The head 24 of the bushing is hexagonal, and is similar in size and shape to the recess 14 in the sheet metal wall 10. The bushing 20 has a central aperture 27 with interior threads 28 adapted to receive a fitting such as an elbow, nipple, drain cock or the like.

Figure 6:
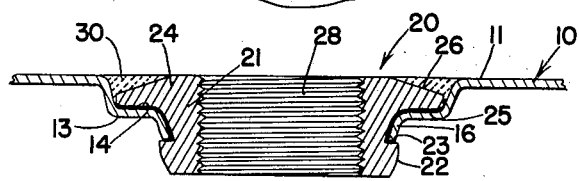
Figure 6 is a sectional elevational view taken along a line 6—6 in Figure 5, and after the solder has been applied.

The bushing is installed in the opening 12 by pressing the bead portion 22 downwardly through the flange 16 until the bead snaps through beyond the end of the flange 16, after which the radial inner surface 23 of the bead abuts the edge of the flange 16 and the bottom 25 of the bushing seats on the bottom of the recess. With ordinary grades of sheet metal, however, the flange 16 is not elastic enough to snap into place and firmly embrace the body 21 of the bushing and therefore it is desirable to swage the flange by placing an annular tool over the beader end of the bushing and exerting pressure thereupon to press the flange into close contact with the body 21, behind the shoulder 23 as shown in Figure 6. In this position, the hexagonal head 24 of the bushing seats within the recess 14, being relatively tightly surrounded by the side wall portions of the cup, and the upper end fo the head is substantially flush with the surface 11 of the wall 10. The bushing is then soldered into the recess, preferably by applying heat to the offset portion 13 of the wall from below as viewed in Figure 6, and flowing sealing material, such as solder, in from above, filling the pocket means provided by space between the conical bushing surface 26 and the plane or general level of the upper surface 11 of the wall, as indicated at 30, until the surface of the solder 30 is flush with the top of the bushing head and the surface 11 of the wall. This makes a neat, smooth surface on the inside of the tank, which permits the latter to be drained completely in those cases where the bushing is used as an outlet connection, and the solder also firmly secures the bushing in the recess portion of the tank. Some of the solder 30 will run down under the head of the bushing and between the body of the bushing and the lower flange 16, and effectively seals the bushing in the recess to prevent any leakage of fluid around the outside of the bushing.

One of the principal advantages of this type of connection, however, is that the solder is not relied upon to prevent the bushing from rotating relative to the wall 10 when the fitting is screwed into the threads 28 or when the fitting is unscrewed after an extended period of use in which the threads 28 may have become corroded. The sides 15 of the recess 14 embrace the polygonal head 24 of the bushing sufficiently closely to retain the bushing against rotation when such force is applied. It is evident from the above description that by seating the fitting within the recess and swaging the flange around the body of the fitting, the interlocking effect of the sheet metal with the fitting produces an extremely strong and durable joint that is sufficient for some purposes. The addition of the solder produces an even stronger joint, which does not depend upon the adhesive strength of the solder for support but rather, the solder rigidifies and supplements the interlock between the parts, as well as sealing the joint against leakage of gas or liquid. Failure of the solder does not occur unless the sheet metal around the fitting is actually torn or stretched sufficient to transfer the forces to the sealing material to stress the latter beyond its elastic limit. Various kinds of sealing material can be used depending on the purpose of the joint. For instance, a plastic or a rubber material can be employed. It is not essential that this material be poured in liquid form after the fitting is in place, but may be inserted in the form of a gasket between the fitting and the sheet metal.

Although the present embodiment of my invention is based upon the use of a bushing, it is to be understood that the invention is not limited to such, for the same principles may be used for installing other types of fittings. Furthermore, the bushing can be used in sheet metal structures other than tanks. For example, the bushing can be installed in a sheet metal wall and adapted to receive a brace rod or the like.

I do not intend my invention to be limited to the exact details shown and described herein, except as set forth in the claims which follow.

I claim:

1. In combination, a wall of thin sheet material having a circular opening therein, said material being offset to provide a recess or indentation polygonal in shape around said opening and a circular flange around the opening extending away from said sheet, a fitting of circular cross section and having a bead around one end and a polygonal head at the other end, said bead being adapted to be pressed through said opening and engage the end of said flange and said head being adapted to seat in said recess, the polygonal head interfitting with said polygonal recess to prevent rotation of said fitting in said opening.

2. The combination set forth in claim 1 including the further provision of sealing material filling the spaces between said fitting head and said recess and adapted to prevent leakage of fluid around said fitting.

3. In combination, a sheet metal wall having a circular opening therein, the sheet metal being offset to provide a polygonal recess or indentation around said opening and a circular flange around the opening extending away from said wall, a bushing of generally circular cross section disposed within said opening and closely embraced by said flange, said bushings having a polygonal radial flange seated in said recess to prevent rotation of said bushing therein and a bead around the end of the bushing engaging the end of said sheet metal flange around the opening in said wall, said circular flange of the wall being adapted to be swaged behind said flange after the bushing is in place.

4. In sheet metal tank construction, the combination with a sheet metal wall having a circular opening therein, the sheet metal being offset to provide a polygonal recess or indentation around said opening, a bushing of generally circular cross section extending through said opening and having a polygonal radial flange seated in said recess and substantially similar in size and shape to the latter to prevent rotation of said bushing relative to said wall, said flange being substantially flush with the surface of the wall adjacent said recess, and sealing means comprising solder or the like filling the spaces between said flange and the recess in which it is seated, said sealing means being flush with said wall surface to form a smooth fluid-tight seal around said bushing.

5. In sheet metal tank construction, the combination of a sheet metal wall having a circular opening therein, the sheet metal being offset to provide a polygonal recess or indentation around said opening outwardly of the inner surface of said wall, and a circular flange around the opening extending away from said wall, a bushing of generally circular cross section extending through said flange and closely embraced thereby, a bead on the outer end of said bushing engaging the outer end of said flange, a polygonal head on the inner end of said bushing of generally similar size and shape to said recess and seated in the latter to prevent rotation of said bushing relative to said wall, and sealing means comprising solder or the like filling the spaces between said head and the recess in which it is seated, said sealing means and the inner end of said bushing being flush with the inner wall surface to provide a smooth fluid-tight surface around the opening in said bushing.

6. In combination, a wall of sheet material having a circular opening therein, said material being offset to provide a continuous recess or indentation surrounding the opening and having the shape of a regular polygon, a fitting having a circular portion disposed within said opening and a polygonal portion similar in size and shape to and seated in and held by said recess against relative rotation about the axis of said opening, and means for securing said fitting within said opening.

7. In combination, a wall of sheet material having a circular opening therein, said material being offset to provide a continuous recess or indentation surrounding the opening and having the shape of a regular polygon, said material further having a circular flange around the opening extending axially away from said recess, a fitting of circular cross section disposed in said opening and closely embraced by said flange and having a polygonal portion of size and shape substantially coincident with and seated in said recess and substantially flush with the surface of said wall, and means securing said fitting within said flange.

8. The combination set forth in claim 7, including the further provision that said securing means comprises sealing material filling the spaces between said fitting head and said recess and adapted to prevent leakage of fluid around said fitting.

9. In combination: a first member including a main wall and a pair of adjoining integral wall sections providing a recess or indentation generally in the shape of a cup having its side wall portions at an angle to the main wall and its bottom at an angle to the side wall portions and displaced away from the general level of the main wall so that the main wall adjoins generally the rim of the cup; a second member carried by the first member and relatively tightly surrounded by the side wall portions of the cup and seating on the bottom of the cup, said second member having reduced portions below the rim of the cup and the level of the main wall to cooperate with the rim for providing pocket means within the confines of the cup side wall portions; and sealing material contained in the pocket means to the level of the main wall and overlying said reduced portions to seal the joint between the second member and both the main wall and side wall portions of the cup.

10. The invention defined in claim 9, further characterized in that: the wall section providing the side walls of the cup is annular but non-circular and the second member is similarly shaped and sized to establish a torque-resisting interlock substantially isolating the sealing material from torsional stress due to potential relative rotation between the two members about the axis of the cup.

11. The invention defined in claim 10, further characterized in that: the shape of the side walls of the cup is that of a regular polygon formed about the axis of the cup and the shape and size of the second member within the cup are similar to those of said side wall portions.

12. The invention defined in claim 11, further characterized in that: the bottom of the cup has a circular opening surrounded by an annular flange, the second member extends axially through said opening and has an annular groove, and said flange is swaged into said groove.

RICHARD B. SHORE.

REFERENCES CITED

The following references are of record in the file of this patent:

UNITED STATES PATENTS

| Number | Name | Date |
| --- | --- | --- |
| 1,856,747 | Cooper | May 3, 1932 |
| 1,901,201 | Taylor | Mar. 14, 1933 |
| 1,920,807 | Runser | Aug. 1, 1933 |
| 1,931,243 | Wackman | Oct. 17, 1933 |
| 2,018,683 | Meyer | Oct. 29, 1935 |
| 2,236,496 | Beggs | Apr. 1, 1941 |

FOREIGN PATENTS

| Number | Country | Date |
| --- | --- | --- |
| 510,263 | Great Britain | July 31, 1939 |